(12) United States Patent
Tsai

(10) Patent No.: US 11,813,809 B2
(45) Date of Patent: Nov. 14, 2023

(54) METHOD OF MANUFACTURING A COMPOSITE RIM

(71) Applicant: Marshal Industrial Corp., Tortola (VG)

(72) Inventor: Ming-Jen Tsai, Miaoli County (TW)

(73) Assignee: MARSHAL INDUSTRIAL CORP., Tortola (VG)

( * ) Notice: Subject to any disclaimer, the term of this patent is extended or adjusted under 35 U.S.C. 154(b) by 41 days.

(21) Appl. No.: 17/743,903

(22) Filed: May 13, 2022

(65) Prior Publication Data

US 2022/0274355 A1 Sep. 1, 2022

Related U.S. Application Data

(63) Continuation-in-part of application No. 16/897,104, filed on Jun. 9, 2020, now abandoned.

(30) Foreign Application Priority Data

Jun. 21, 2019 (TW) .................................. 108121609

(51) Int. Cl.
```
B29C 70/44       (2006.01)
B29C 70/42       (2006.01)
B29K 307/04      (2006.01)
B29L 31/32       (2006.01)
```

(52) U.S. Cl.
CPC ............ B29C 70/446 (2013.01); B29C 70/42 (2013.01); *B29K 2307/04* (2013.01); *B29L 2031/32* (2013.01)

(58) Field of Classification Search
CPC ......... B29C 70/42; B29C 70/44; B29C 70/46; B29C 70/54; B60B 5/00
See application file for complete search history.

(56) References Cited

U.S. PATENT DOCUMENTS

| | | | | |
|---|---|---|---|---|
| 2,489,643 | A * | 11/1949 | Hunter | B29C 70/882 425/389 |
| 3,111,569 | A * | 11/1963 | Rubenstein | B29C 70/86 264/45.2 |
| 3,419,455 | A * | 12/1968 | Roberts | B29C 70/0035 264/46.7 |
| 3,493,240 | A * | 2/1970 | Jenks | A63C 5/12 264/572 |
| 3,795,559 | A * | 3/1974 | Horn et al. | B64C 1/36 156/173 |
| 3,804,259 | A * | 4/1974 | Riggleman | B01D 69/10 210/490 |
| 3,892,831 | A * | 7/1975 | Robin | A63B 49/11 264/231 |

(Continued)

*Primary Examiner* — Andrew D Graham
(74) *Attorney, Agent, or Firm* — Muncy, Geissler, Olds & Lowe, P.C.

(57) ABSTRACT

A method of manufacturing a composite rim includes following steps of: disposing a composite material on an outer surface of an air bag to form a semi-formed rim, wherein the air bag is a completely closed annular tube without any through opening on the outer surface and contains a thermal expansion material thereinside; disposing the semi-formed rim in a mold; and heating the thermal expansion material so that the thermal expansion material expands and inflates the air bag and the semi-formed rim is then solidified.

10 Claims, 7 Drawing Sheets

(56) References Cited

U.S. PATENT DOCUMENTS

| | | | | |
|---|---|---|---|---|
| 3,916,418 A * | 10/1975 | Erdmann | H01Q 15/142 | 343/912 |
| 4,030,754 A * | 6/1977 | Merlette | B29D 99/0032 | 301/95.103 |
| 4,061,520 A * | 12/1977 | Cecka | A63B 49/10 | 473/535 |
| 4,070,021 A * | 1/1978 | Cecka | A63B 60/00 | 428/377 |
| 4,124,670 A * | 11/1978 | Cecka | A63B 49/10 | 264/45.3 |
| 4,314,964 A * | 2/1982 | Ferrary | B60B 5/02 | 264/516 |
| 4,584,900 A * | 4/1986 | Masuda | B29C 70/44 | 74/552 |
| 4,741,578 A * | 5/1988 | Viellard | B60B 1/003 | 301/58 |
| 4,793,659 A * | 12/1988 | Oleff | B60B 21/02 | 264/328.8 |
| 4,919,490 A * | 4/1990 | Hopkins | B60B 5/02 | 301/110.5 |
| 4,930,843 A * | 6/1990 | Lewis | B60B 1/003 | 301/74 |
| 4,983,430 A * | 1/1991 | Sargent | B29C 31/002 | 264/315 |
| 5,073,444 A * | 12/1991 | Shanelec | B60C 7/1015 | 521/142 |
| 5,080,444 A * | 1/1992 | Hopkins | B60B 1/003 | 301/95.102 |
| 5,184,874 A * | 2/1993 | Olson | B29C 45/4457 | 301/64.705 |
| 5,240,661 A * | 8/1993 | Parker | B29C 70/446 | 264/103 |
| 5,249,846 A * | 10/1993 | Martin | B60B 21/04 | 301/95.104 |
| 5,505,492 A * | 4/1996 | Nelson | A63C 11/22 | 428/36.1 |
| 5,512,119 A * | 4/1996 | Takezawa | B29C 70/10 | 156/193 |
| 5,534,203 A * | 7/1996 | Nelson | A63B 53/12 | 264/257 |
| 5,580,627 A * | 12/1996 | Goodwin | B29D 99/0003 | 428/36.1 |
| 5,624,519 A * | 4/1997 | Nelson | B62K 19/22 | 264/258 |
| 5,653,510 A * | 8/1997 | Osborne | B60B 21/062 | 301/95.104 |
| 5,899,118 A * | 5/1999 | Satoh | B62D 1/04 | 74/552 |
| 5,960,834 A * | 10/1999 | Sekido | A63B 60/00 | 138/172 |
| 5,975,645 A * | 11/1999 | Sargent | B60B 5/02 | 301/58 |
| 6,024,413 A * | 2/2000 | Dixon | B60B 21/062 | 301/58 |
| 6,048,035 A * | 4/2000 | Chen | B60B 21/062 | 301/58 |
| 6,082,075 A * | 7/2000 | Rysgaard | E04B 1/32 | 52/843 |
| 6,086,161 A * | 7/2000 | Luttgeharm | B60B 21/062 | 301/95.104 |
| 6,402,256 B1 * | 6/2002 | Mercat | B60B 21/04 | 301/58 |
| 6,589,125 B1 * | 7/2003 | Tsai | A63B 49/022 | 301/95.102 |
| 6,761,847 B2 * | 7/2004 | Meggiolan | B29C 70/446 | 264/258 |
| 6,991,298 B2 * | 1/2006 | Ording | B60B 5/02 | 29/894.35 |
| 6,991,300 B2 * | 1/2006 | Colegrove | B60B 21/08 | 188/24.13 |
| 7,258,402 B2 * | 8/2007 | Meggiolan | B60B 21/025 | 301/95.107 |
| 7,377,595 B1 * | 5/2008 | Okajima | B60B 1/041 | 301/58 |
| 7,651,654 B2 * | 1/2010 | Meggiolan | B60B 21/062 | 264/315 |
| 7,858,011 B2 * | 12/2010 | Reuteler | B60B 5/02 | 264/501 |
| 7,918,514 B2 * | 4/2011 | Dal Pra' | B60B 21/04 | 301/95.102 |
| 8,002,362 B2 * | 8/2011 | Colegrove | B60B 21/00 | 301/95.104 |
| 8,186,766 B2 * | 5/2012 | Meggiolan | B60B 1/0215 | 301/58 |
| 8,328,666 B2 * | 12/2012 | Hsu | B29C 70/446 | 473/535 |
| 8,777,328 B2 * | 7/2014 | Meggiolan | B60B 21/04 | 301/95.104 |
| 9,302,540 B2 * | 4/2016 | Hsu | B60B 21/00 | |
| 9,346,319 B2 * | 5/2016 | Schiers | B60B 1/003 | |
| 9,688,097 B2 * | 6/2017 | Meggiolan | B29C 70/446 | |
| 10,065,450 B2 * | 9/2018 | Righini | B60B 21/062 | |
| 2002/0108249 A1 * | 8/2002 | Meggiolan | B60B 21/062 | 156/242 |
| 2002/0190439 A1 * | 12/2002 | Nelson | B29C 33/52 | 264/317 |
| 2003/0107260 A1 * | 6/2003 | Ording | B60B 5/02 | 301/95.102 |
| 2004/0009338 A1 * | 1/2004 | Jo | B29C 70/506 | 428/297.4 |
| 2004/0066085 A1 * | 4/2004 | Schiers | B60B 21/062 | 301/95.102 |
| 2004/0227393 A1 * | 11/2004 | Meggiolan | B60B 21/12 | 264/572 |
| 2005/0017569 A1 * | 1/2005 | Passarotto | B60B 21/062 | 301/58 |
| 2007/0046097 A1 * | 3/2007 | Mercat | B60B 21/025 | 301/55 |
| 2007/0135245 A1 * | 6/2007 | Gazzara | A63B 49/022 | 156/147 |
| 2007/0194619 A1 * | 8/2007 | Colegrove | B60B 25/02 | 301/95.101 |
| 2007/0200422 A1 * | 8/2007 | Davis | B60B 1/003 | 301/58 |
| 2007/0205654 A1 * | 9/2007 | Denk | B60B 21/062 | 301/95.102 |
| 2008/0191543 A1 * | 8/2008 | Saillet | B60B 1/0261 | 301/55 |
| 2008/0265657 A1 * | 10/2008 | Reuteler | B29C 70/865 | 264/258 |
| 2008/0265658 A1 * | 10/2008 | Reuteler | B60B 5/02 | 29/894.35 |
| 2010/0013119 A1 * | 1/2010 | Meggiolan | B60B 5/02 | 264/271.1 |
| 2010/0090518 A1 * | 4/2010 | Schiers | B60B 21/026 | 156/154 |
| 2010/0148408 A1 * | 6/2010 | Yen | B29C 70/462 | 264/516 |
| 2010/0253132 A1 * | 10/2010 | Schlanger | B60B 7/06 | 301/55 |
| 2011/0011008 A1 * | 1/2011 | Dagher | E04G 11/045 | 425/63 |
| 2011/0039047 A1 * | 2/2011 | Carson | B29C 70/22 | 156/149 |
| 2011/0084543 A1 * | 4/2011 | Lew | B29C 70/44 | 264/572 |
| 2011/0136602 A1 * | 6/2011 | Hsu | A63B 49/11 | 473/535 |
| 2011/0206926 A1 * | 8/2011 | Marc | B29C 44/587 | 428/319.3 |
| 2012/0128905 A1 * | 5/2012 | Troi | B32B 1/08 | 428/36.1 |
| 2013/0049441 A1 * | 2/2013 | Smart | B60B 1/003 | 301/95.104 |
| 2014/0049097 A1 * | 2/2014 | Lin | B60B 25/02 | 156/182 |
| 2014/0088214 A1 * | 3/2014 | Okamoto | B29B 7/7495 | 525/232 |

(56) References Cited

U.S. PATENT DOCUMENTS

| | | | |
|---|---|---|---|
| 2014/0103561 A1* | 4/2014 | Huang | B29C 33/505 |
| | | | 264/46.6 |
| 2014/0227467 A1* | 8/2014 | Fraidenburgh | A63B 53/10 |
| | | | 428/36.1 |
| 2014/0308433 A1* | 10/2014 | Ouellette | B05D 7/22 |
| | | | 427/230 |
| 2016/0280871 A1* | 9/2016 | Kaneko | C08L 33/12 |
| 2020/0369081 A1* | 11/2020 | D'Armancourt | B29C 70/222 |

* cited by examiner

METHOD OF MANUFACTURING A COMPOSITE RIM

BACKGROUND OF THE INVENTION

Field of the Invention

The present invention is a CIP of application Ser. No. 16/897,104, filed Jun. 9, 2020, the entire contents of which are hereby incorporated by reference.

DESCRIPTION OF THE PRIOR ART

A conventional method of manufacturing a composite rim process, such as the traditional internal pressure process, needs to place nylon, latex or silicone air bag in the pre-preg composite material (such as carbon fiber). An air blowing port must be provided on the air bag for inflating the air bag during heating and solidifying the resin of the composite, so that there is a pressure different between inside and outside of the air bag for squeezing out excess resin and push the pre-preg composite toward the mold to enhance combination of layers of the pre-preg composite. During the solidification process, the air pressure needs to be controlled within a reasonable range of pressure different between inside and outside of the air bag. With an air pressure too low, the resin content of the final product will be too high, the bonding density between layers of the pre-preg composite will be lowered, reducing the structural strength and performance; while with an air pressure too high, the resin content of the final product will be too low, which will cause a decrease in strength and performance of the final product.

US2014/0103561 discloses that the air bag has a nozzle, and a certain amount of filler is filled into the hollow air bag through the nozzle 21, or gas is introduced into the hollow air bag through the nozzle. U.S. Pat. No. 7,258,402 discloses that the bag is equipped with an inflating valve, which communicates externally to the mold by means of a passage. In the conventional methods, since the bag is additionally equipped with a nozzle or an inflating valve, the bag is not a completely closed annular tube without any through opening on the outer surface, is not self-enclosed, and does not has a substantially fixed outer profile in any radial cross-section.

The shortcoming of the conventional method of manufacturing a composite rim process is that it requires manual work to additionally dispose the blowing port to the air bag, and the yield rate depends on the experience and skill of the personnel. If there is any flaw in the process of mounting the blowing port, it may cause insufficient air pressure for blowing the air bag or may cause the product to be scrapped due to air leakage.

The present invention is, therefore, arisen to obviate or at least mitigate the above-mentioned disadvantages.

SUMMARY OF THE INVENTION

The main object of the present invention is to provide a method of manufacturing a composite rim which has high precision, good yield and high structural strength.

To achieve the above and other objects, a method of manufacturing a composite rim is provided, including steps of: disposing a composite material on an outer surface of an air bag to form a semi-formed rim, wherein the air bag is a completely closed annular tube without any through opening on the outer surface and contains a thermal expansion material thereinside; disposing the semi-formed rim in a mold; and heating the thermal expansion material so that the thermal expansion material expands and inflates the air bag and the semi-formed rim is then solidified.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
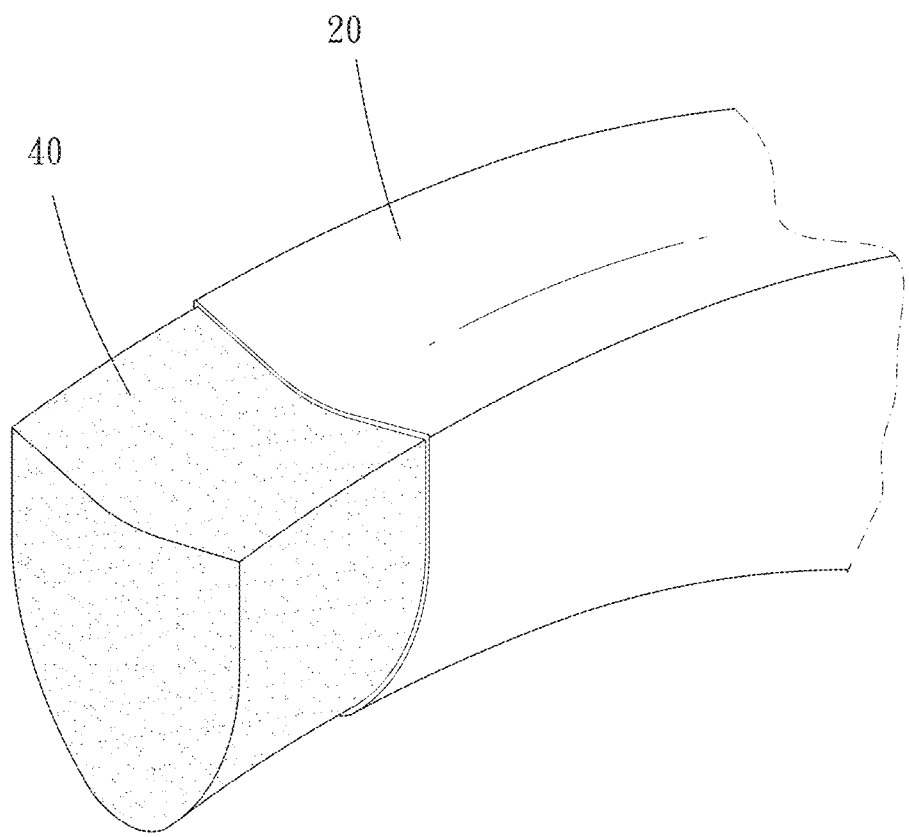
FIG. 1 is a drawing showing a closed air bag containing a thermal expansion material according to a preferable embodiment of the present invention.
Figure 2:
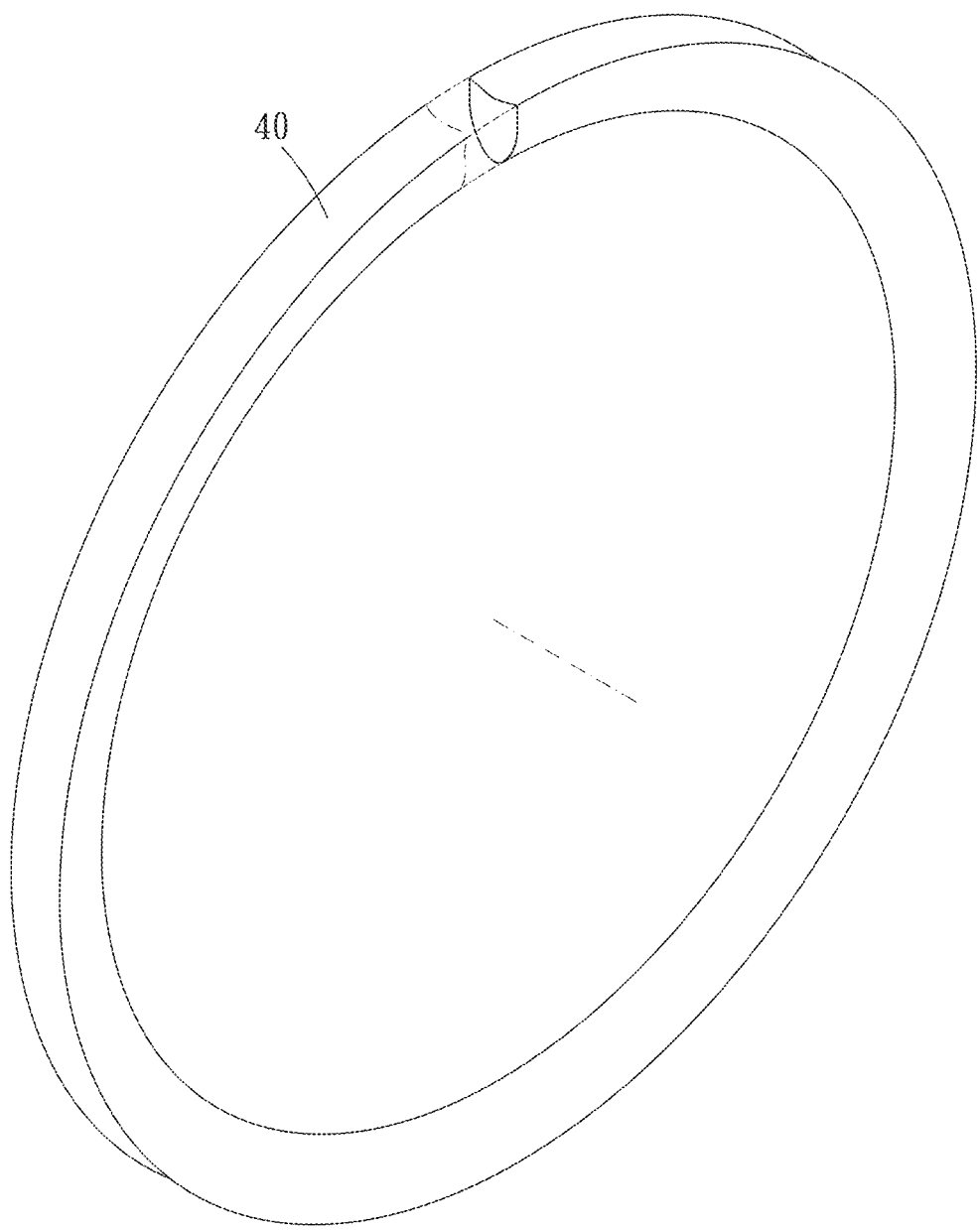
FIG. 2 is a drawing showing an annular thermal expansion material according to a preferable embodiment of the present invention.
Figure 3:
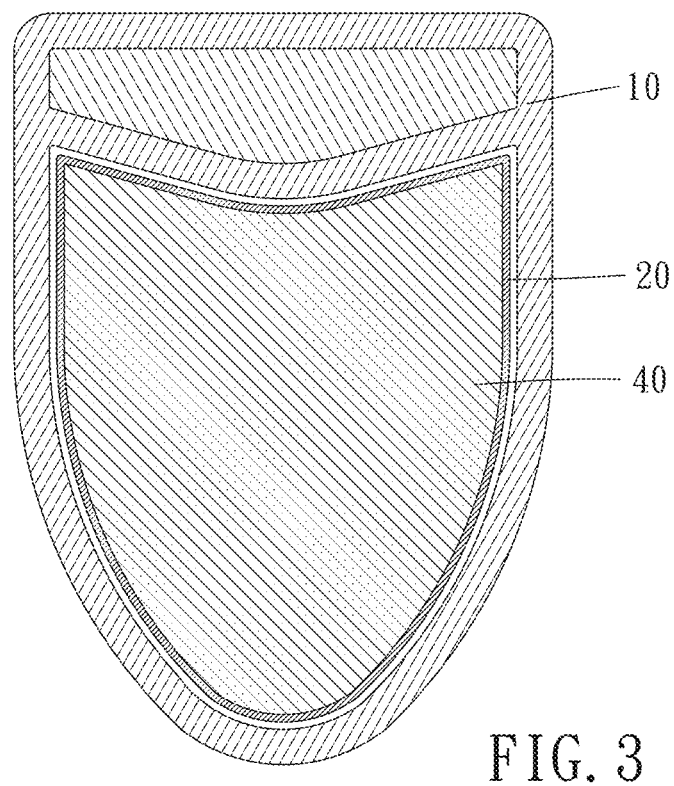
FIGS. 3 and 4 are drawings showing a thermal expansion material inflating an air bag according to a preferable embodiment of the present invention.
Figure 4:
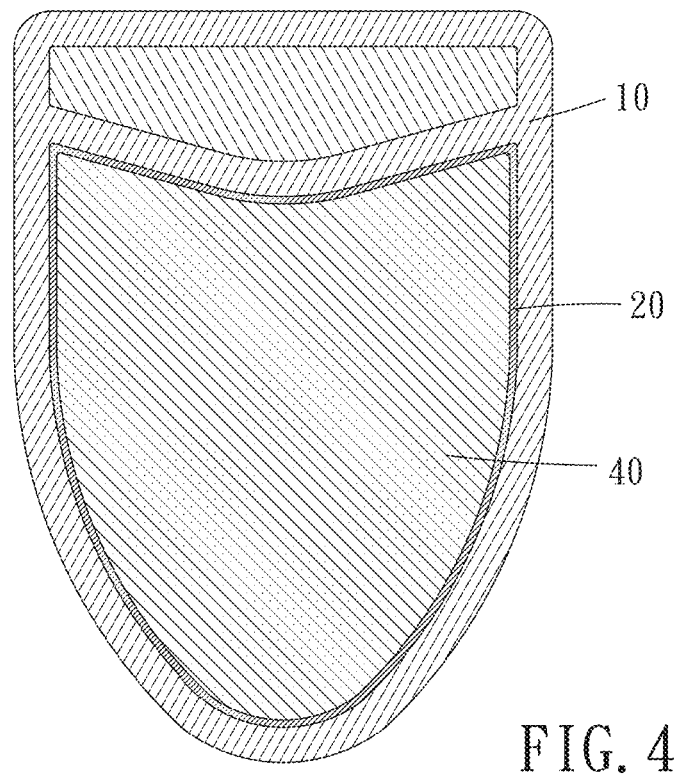
Figure 5:
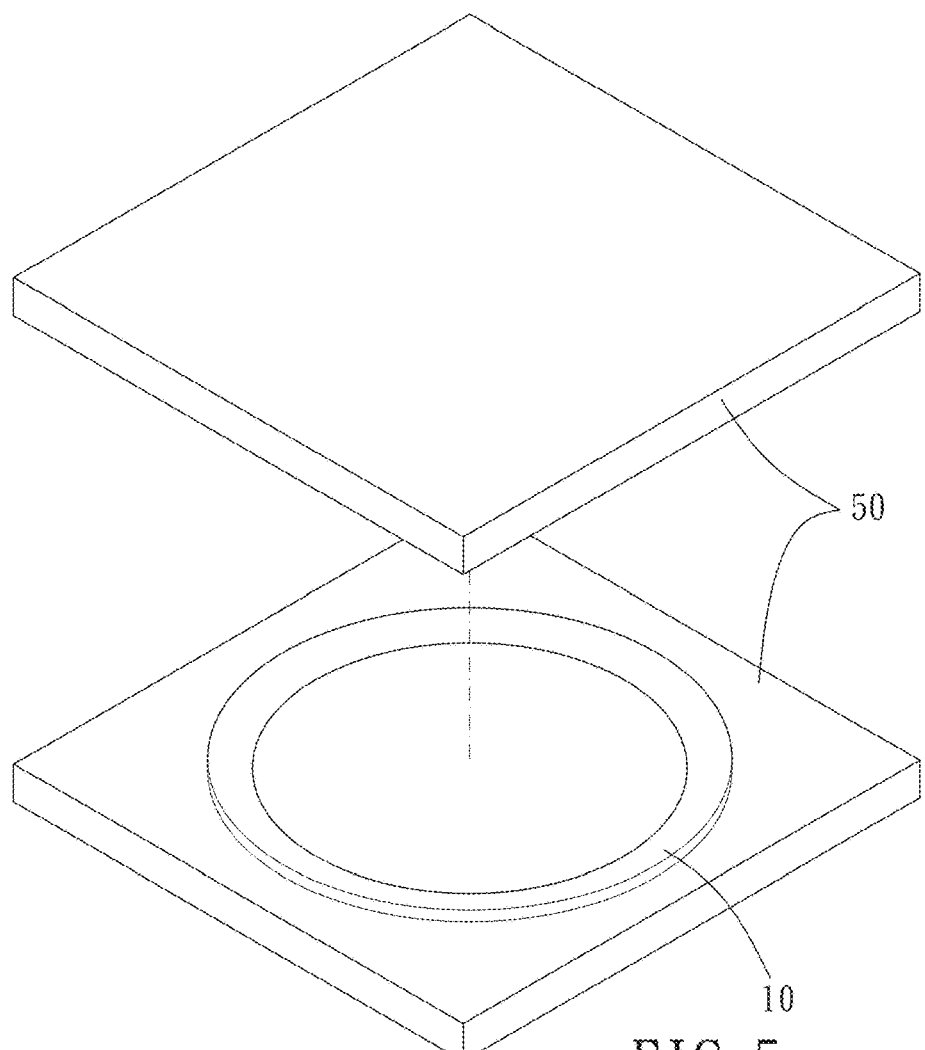
FIGS. 5 and 6 are drawings showing a semi-formed rim formed in a mold according to a preferable embodiment of the present invention.
Figure 6:
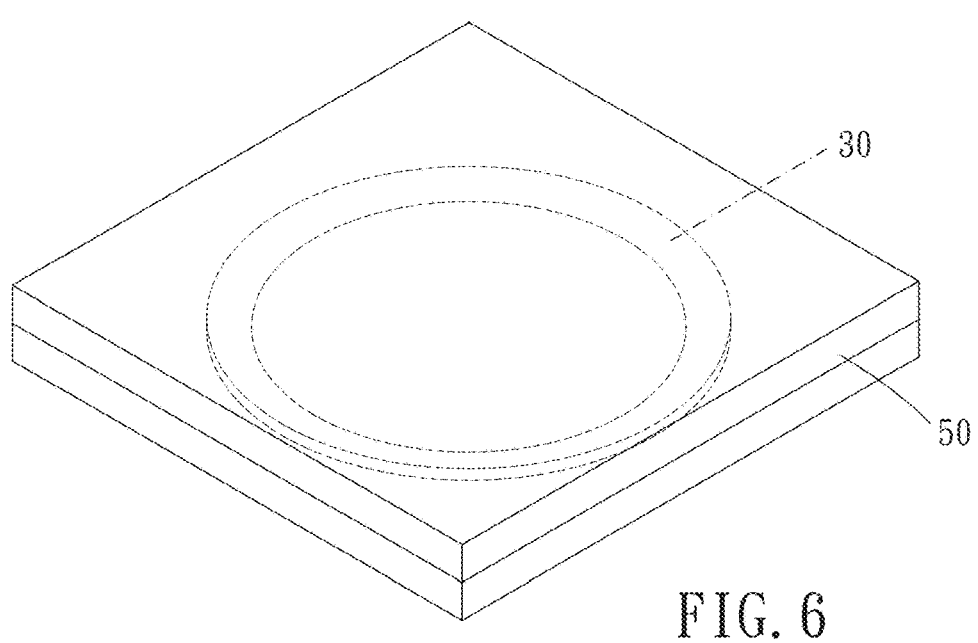
Figure 7:
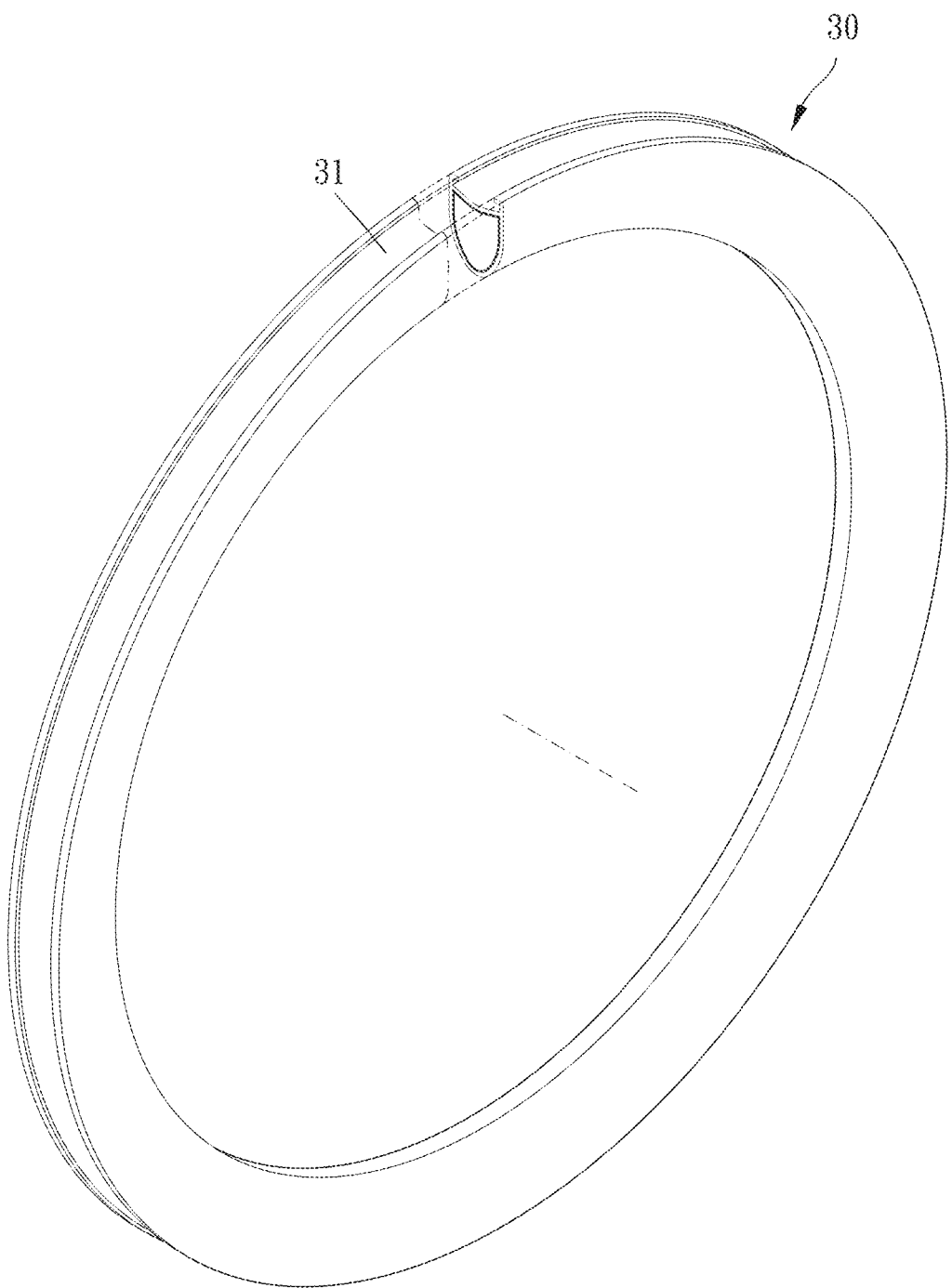
FIG. 7 is a drawing showing forming a tire installation groove according to a preferable embodiment of the present invention.
Figure 8:
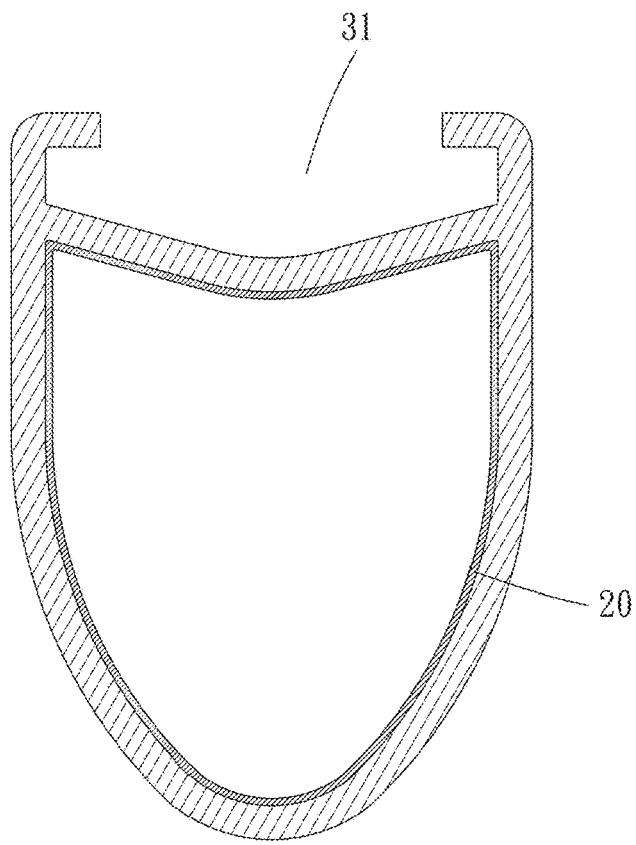
FIGS. 8 and 9 are drawings showing a composite rim with an air bag removed according to a preferable embodiment of the present invention.

Please refer to FIGS. 1 to 9 for a preferable embodiment of the present invention. A method of manufacturing a composite rim of the present invention includes the following steps of: disposing a composite material 10 on an outer surface of an air bag 20 to form a semi-formed rim 30, wherein before the composite material 10 is disposed on the outer surface of the air bag 20 the air bag 20 is a completely closed annular tube without any through opening on the outer surface and contains a thermal expansion material 40 thereinside; disposing the semi-formed rim 30 in a mold 50; heating the thermal expansion material 40 so that the thermal expansion material 40 expands and inflates the air bag 20 and the semi-formed rim 30 is solidified. Whereby, it has high precision and good yield, and the air bag 20 can be well fitted with the composite material 10, which provides high structural strength of the composite rim.

Figure 9:
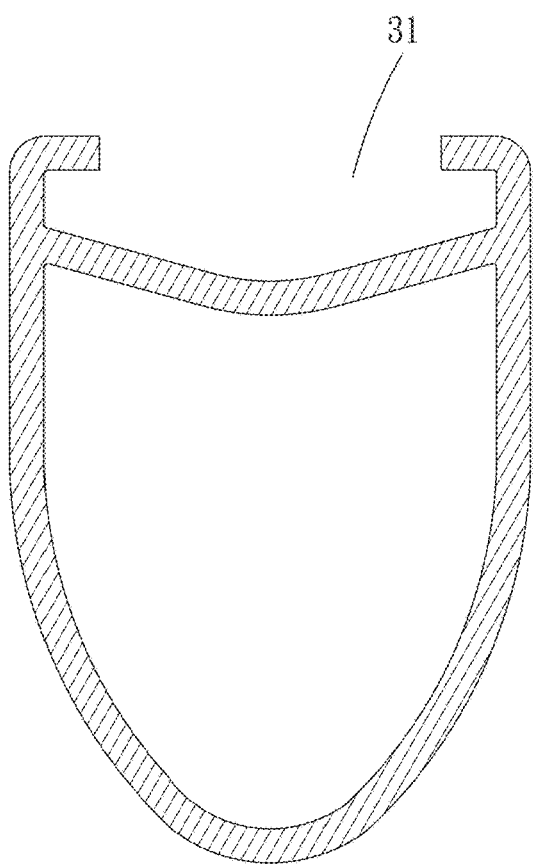

The composite material 10 is a carbon fiber composite material; however, the composite material may be other type of reinforced fiber composite material. In this embodiment, the thermal expansion material 40 is wax, and the air bag 20 is inflated by the thermal expansion material 40 of a volume change of 15%. Preferably, after the semi-formed rim 30 is solidified, the air bag 20 and the thermal expansion material 40 are removed (FIG. 9). In this embodiment, after the semi-formed rim 30 is solidified, an outer annular part of the semi-formed rim 30 may be removed to form a tire installation groove 31 for receiving a tire.

Figure 10:
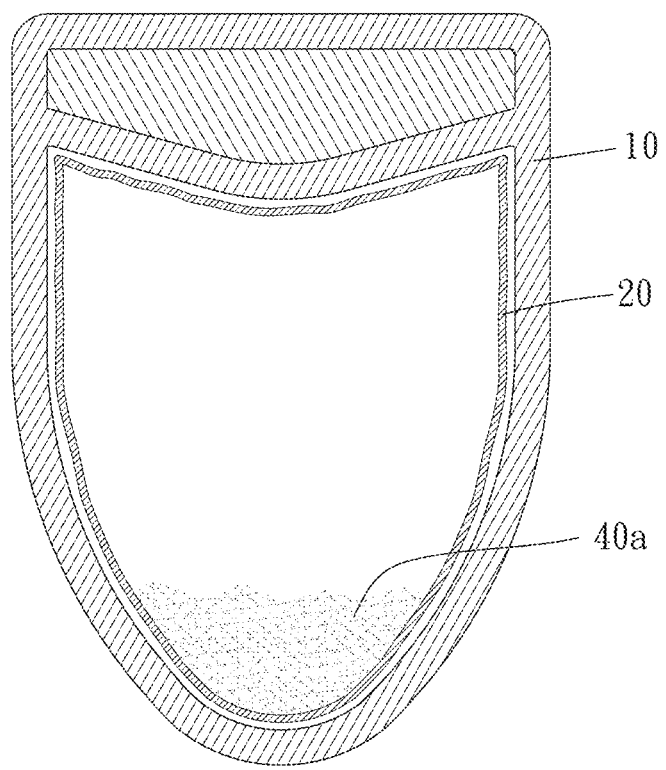
FIGS. 10 and 11 are drawings showing a thermal expansion material inflating an air bag according to another preferable embodiment of the present invention.
Figure 11:
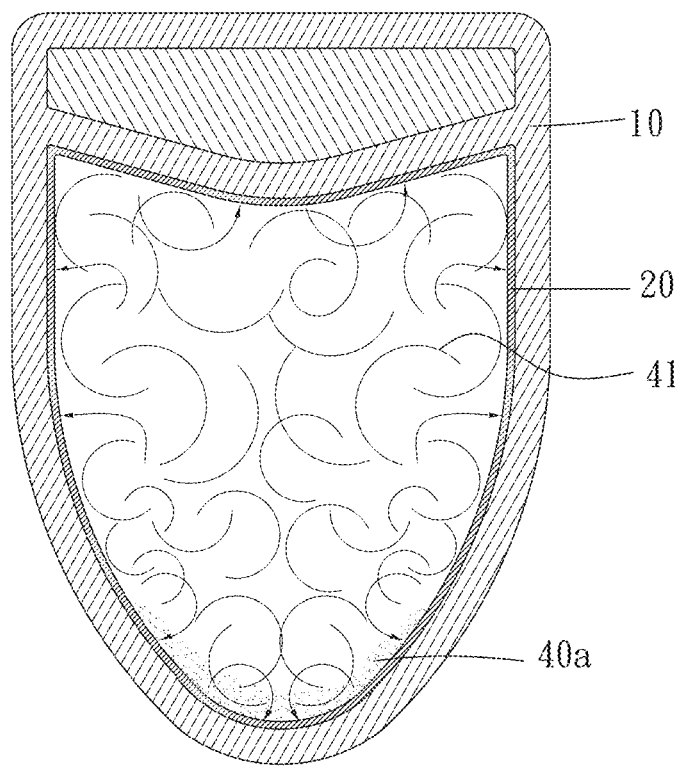

In an alternative embodiment shown in FIGS. 10 and 11, the thermal expansion material 40a produces gas 41 during inflation of the air bag 20. The pressure generated by the thermal expansion material 40a to inflate the air bag 20 is 1 kg/cm² to 20 kg/cm². The thermal expansion material 40*a* may be ammonium carbonate. After the inflation of the thermal expansion material 40, the air bag 20 contains a part of the thermal expansion material 40*a* which is solid state and the gas 41 which is produced from thermal expansion material 40. It is noted that the thermal expansion material 40*a* may be completely gasified, and none of residue of solid-state thermal expansion material is contained in the air bag 20. In the embodiment with the thermal expansion material 40*a* being ammonium carbonate, the ammonium carbonate can be decomposed into carbon dioxide, ammonia and $H_2O$ at a temperature about 60° C., wherein 1 gram of ammonium carbonate can be decomposed to produce 0.25 grams of carbon dioxide which is equal to 0.5 liters of gas. The amount of adding ammonium carbonate can be chosen according to the reserved space of the mold 50 and predetermined inflation rate.

It is noted that the thermal expansion material in the air bag, initially, may be gas such as inert gas, in which gas can have greater volume change when heated, and inert gas is much stable and safe; however, other gas may be applicable. The thermal expansion material in the air bag, initially, may be fluid, which can provide precise inflation, sufficient inflation volume change and good inflation rate. Gas-state or fluid-state thermal expansion material is convenient to be removed after the semi-formed rim is solidified.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a composite rim, including steps of:
    disposing a composite material on an outer surface of an air bag to form a semi-formed rim, wherein before the composite material is disposed on the outer surface of the air bag the air bag is a completely closed annular tube without any through opening on the outer surface and contains a thermal expansion material thereinside, the outer surface of the air bag is self-enclosed and has a substantially fixed outer profile in any radial cross-section, the air bag is integrally formed of one piece, the air bag is annularly hollow thereinside, and the any radial cross-section is completely and annularly closed itself;
    disposing the semi-formed rim in a mold; and
    heating the thermal expansion material so that the thermal expansion material expands and inflates the air bag and the semi-formed rim is then solidified.

2. The method of claim 1, wherein the composite material is a carbon fiber composite material.

3. The method of claim 1, wherein the pressure generated by the thermal expansion material to inflate the air bag is 1 kg/cm² to 20 kg/cm².

4. The method of claim 3, wherein the thermal expansion material produces gas during inflation of the air bag.

5. The method of claim 4, wherein the thermal expansion material is ammonium carbonate.

6. The method of claim 5, wherein the composite material is a carbon fiber composite material; after the inflation of the thermal expansion material, the air bag contains a part of the thermal expansion material which is solid state and the gas which is produced from the thermal expansion material; after the semi-formed rim is solidified, the air bag and the thermal expansion material are removed.

7. The method of claim 1, wherein the air bag is inflated by the thermal expansion material of a volume change of 15%.

8. The method of claim 7, wherein the thermal expansion material is wax.

9. The method of claim 8, wherein the composite material is carbon fiber composite material; after the semi-formed rim is solidified, the air bag and the thermal expansion material are removed.

10. The method of claim 1, wherein the thermal expansion material is gas.

* * * * *